United States Patent [19]
Carlson et al.

[11] Patent Number: 4,523,230
[45] Date of Patent: Jun. 11, 1985

[54] SYSTEM FOR CORING AN IMAGE-REPRESENTING SIGNAL

[75] Inventors: Curtis R. Carlson; Edward H. Adelson, both of Princeton; Charles H. Anderson, Rocky Hill, all of N.J.

[73] Assignee: RCA Corporation, Princeton, N.J.

[21] Appl. No.: 663,152

[22] Filed: Oct. 22, 1984

[30] Foreign Application Priority Data

Nov. 1, 1983 [GB] United Kingdom ............... 8329109

[51] Int. Cl.³ .................... H04N 5/14; H04N 5/21
[52] U.S. Cl. ................................................ 358/167
[58] Field of Search ............... 358/160, 163, 166, 167, 358/905, 21 R, 36; 382/49, 54

[56] References Cited

U.S. PATENT DOCUMENTS

| | | | |
|---|---|---|---|
| 4,163,258 | 7/1979 | Ebihara | 358/167 |
| 4,442,454 | 4/1984 | Powell | 358/167 |
| 4,463,381 | 7/1984 | Powell | 358/167 |

Primary Examiner—Tommy P. Chin
Attorney, Agent, or Firm—Joseph S. Tripoli; George E. Haas; George J. Seligsohn

[57] ABSTRACT

Noise reduction is achieved, without the introduction of noticeable artifacts in the displayed image, using (1) a non-ringing, non-aliasing, localized transfer, octave-band spectrum analyzer for separating the video signal representing the image into subspectra signals, (2) separate coring means for one or more of the analyzed subspectra signals, and (3) then a synthesizer employing one or more non-ringing, non-aliasing filters for deriving an output image-representing signal from all of the subspectra signals.

24 Claims, 8 Drawing Figures

SYSTEM FOR CORING AN IMAGE-REPRESENTING SIGNAL

BACKGROUND OF THE INVENTION

1. Field of the Invention:

This invention relates to an image-processing system employing coring techniques for reducing the noise component of an image-representing signal, such as a television video signal. More particularly, this invention relates to such a system which reduces this noise component without introducing any significant amount of aliasing or other spurious spatial frequency components into the image-representing signal.

2. Description of the Prior Art:

Coring is a well known technique for reducing the noise component of an image-representing signal. Coring consists of selectively passing only those portions of the image-representing signal which have an absolute amplitude level exceeding a selected threshold magnitude. Coring is a non-linear process that inherently introduces spurious harmonic and intermodulation spatial frequency components into the image-representing signal. The relative power of these spurious spatial frequency components increase as the selected threshold magnitude increases. Therefore, the selection of the coring threshold magnitude is a tradeoff between that which is high enough to substantially reduce the noise component and yet is not so high as to introduce an intolerable amount of spurious spatial frequency components.

The noticeability of a noise component, to an observer of a displayed image derived from an image-representing signal, depends on both (1) the spatial frequency spectrum of the noise component relative to the spatial frequency spectrum of the signal component of the displayed image and (2) on the operation of the human visual system in perceiving noise.

It has been found that human visual system appears to compute a primitive spatial-frequency decomposition of luminous images, by partitioning spatial frequency information into a number of contiguous, overlapping spatial-frequency bands. Each band is roughly an octave wide and the center frequency of each band differs from its neighbors by roughly a factor of two. Research suggests that there are approximately seven bands or "channels" that span the 0.5 to 60 cycle/degree spatial-frequency range of the human visual system. The importance of these findings is that spatial frequency information more than a factor of two away from other spatial frequency information will be independently processed by the human visual system. It has been further found that the spatial-frequency processing that occurs in the human visual system is localized in space. Thus, the signals within each spatial-frequency channel are computed over small subregions of the image. These subregions overlap each other and are roughly two cycles wide at a particular frequency. If a sine wave grating image is employed as a test pattern, it is found that the threshold contrast-sensitivity function for the sine wave grating image rolls-off rapidly as the spatial frequency of the sine wave grating image is increased. That is, high spatial frequencies require high contrast to be seen ($\simeq 20\%$ at 30 cycle/degree) but lower spatial frequencies require relatively low contrast to be seen ($\simeq 0.2\%$ at 3 cycle/degree). It has been found that the ability of the human visual system to detect a change in the contrast of a sine wave grating image that is above threshold also is better at lower spatial frequencies than at higher spatial frequencies. Specifically, an average human subject, in order to correctly discriminate a changing contrast 75% of the time, requires roughly a 12% change in contrast for a 3 cycle/degree sine wave grating, but requires a 30% change in contrast for a 30 cycle/degree grating.

Based on the operation of the human visual system, it becomes clear that a relatively high signal-to-noise (S/N) ratio within an octave spatial frequency band tends to mask the noise (i.e. the noise becomes unnoticeable to an observer) and that this masking effect is more effective for a higher spatial frequency octave than it is for a lower spatial frequency octave. This is true because of the relative decrease in both contrast sensitivity and change-in-contrast sensitivity of the human visual system at higher spatial frequencies. On the other hand, a relatively small high spatial frequency noise component superimposed on a nearly uniform background, which is comprised of dc (zero) or very low spatial frequency video components, is easily noticed by the human visual system. This is significant because real-world images, for the most part, have a spatial frequency spectrum in two dimensions which contains a large amount of relatively low spatial frequency signal energy and only a small amount of high frequency signal energy. This makes any high spatial frequency noise particularly noticeable.

If only a single coring means is employed to core the entire spatial frequency spectrum of an input image-representing signal, the selected threshold magnitude is likely to be too small to satisfactorily reduce the noticeable noise component in one or more octave portions of this spatial frequency spectrum, while at the same time being so high in one or more other octave portions of this spatial frequency spectrum that an intolerable amount of spurious spatial-frequency component artifact is introduced in the displayed image.

This problem can be avoided by first spectrum analyzing the input image-representing signal into a plurality of contiguous subspectra bands, then separately coring each of these bands with a different appropriate selected threshold magnitude, and finally synthesizing these cored bands into a single output image-representing signal which is employed to derive the displayed image.

Reference is made to U.S. Pat. No. 4,442,454, which issued Apr. 10, 1984 to Powell, and is entitled "Image Processing Method Using a Block Overlap Transformation Procedure." This Powell patent discloses a spectrum analyzer for separating the spatial frequency spectrum of an applied sampled two-dimensional image-manifesting signal input into three contiguous subspectra. The spectrum analyzer disclosed in Powell includes predetermined direct transform networks for deriving a fine-detailed (relatively high spatial frequency) subspectrum output at the sampling density of the input signal, an intermediate detail (relatively intermediate spatial frequency) subspectrum output at a reduced sampling density, and a coarse detail (relatively low spatial frequency) subspectrum output at a further reduced sampling density. Each of the respective subspectra output signals from the analyzer is individually first cored and then operated on by an inverse transform network. An expand/interpolation filter is used to increase the sampling density of each of the coarse-detail and intermediate-detail subspectra back to the sampling density of the fine-detail subspectrum, after which the respective cored subspectra signals are summed to derive an output image-representing signal used to provide a reduced-noise display of the represented image.

Powell is aware that image processing of image-representing signals, for the purpose of reducing noise, tends to result in some distortion of local image values (i.e. an artifact of the processing itself is generated that is noticeable in the display of the processed image). In fact, the block overlap transformation procedure of Powell is intended to prevent a noticeable boundary from existing between adjacent blocks in the displayed image. These boundaries are undesirable because they lead to a checkerboard appearance in the displayed image that is unacceptable for high quality image reproduction. Powell also realizes that some distortion of local image values necessarily results from the non-linear coring process, and that this produces an artifact that noticeably affects both the displayed image signal and the residue of unwanted noise. Nevertheless, Powell believes that such an artifact of the coring process has to be tolerated in order to realize the desired noise reduction.

SUMMARY OF THE INVENTION

The image processing system of the present invention permits any noise component originally present in the spectrum of an input image-representing signal to be reduced in the spectrum of the output image-representing signal without introducing any significant amount of aliasing or other spurious spatial frequency component in the spectrum of the output image-representing signal. Thus, the present invention does not require that noticeable artifacts of the processing itself be tolerated in order to realize the desired noise reduction.

More specifically, the image processing system of the present invention is comprised of a substantially non-ringing, non-aliasing, localized transform spectrum analyzer that is responsive to an input image-representing signal defined in at least one dimension of the represented image by a spectrum of spatial frequencies within a range extending from a maximum frequency $f_m$ down to zero. The analyzer separates the input-signal spectrum in descending spatial frequency order starting from $f_m$ into a group of one or more contiguous bandpass subspectra output signals each of which has a nominal bandwidth no greater than one octave within the $f_m$ to zero range, and into a remnant subspectrum output signal containing all those spatial frequencies of the input signal spectrum which are below those contained in the lowest spatial frequency bandpass subspectrum output signal. The image processing system further comprises means for coring at least one of the bandpass subspectra output signals, thereby introducing spurious out-of-band spatial frequency components into each cored subspectrum output signal. Coupled to the analyzer through the coring means is a spectrum synthesizer that is responsive to all of the subspectra signals from the analyzer being applied thereto for deriving an output image-representing signal. This synthesizer is comprised of substantially non-ringing, non-aliasing filter means individually associated with the subspectrum of at least each cored signal that is lower than the highest spatial frequency bandpass output signal. The filter means individually associated with a subspectrum substantially removes at least those spurious frequency components therefrom which are above-band with regard to that subspectrum. The synthesizer is further comprised of means for summing all of the subspectra signals, including both any that has been cored and/or filtered and any that has been neither cored nor filtered, thereby to derive the aforesaid output image representing signal.

A practical implementation of the present invention, for operating in real time on an input video signal representing a scanned television image, may employ a so-called Burt Pyramid spectrum analyzer and Burt Pyramid synthesizer of a type disclosed in co-pending U.S. patent application Ser. No. 596,817, filed Apr. 4, 1984 by Carlson et al., and assigned to the same assignee as the present invention.

BRIEF DESCRIPTION OF THE DRAWING

FIG. 3b illustrates a Burt Pyramid synthesizer which is useful in a practical implementation of the spectrum synthesizer of FIG. 2a;

DESCRIPTION OF THE PREFERRED EMBODIMENTS

Figure 1:
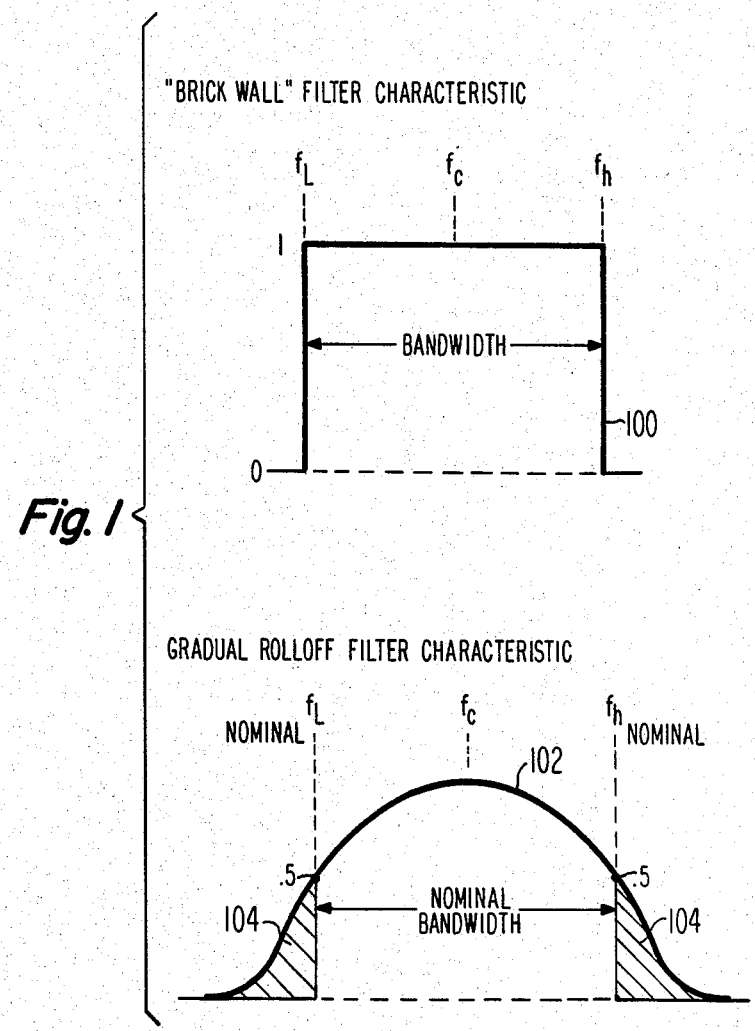
FIG. 1 comprises respective graphs comparing a "brickwall" filter characteristic to a gradual rolloff filter characteristic.

The distinctive feature of the present invention is that its spectrum analyzer and synthesizer each incorporates only filters having gradual rolloff filter characteristics, rather than "brickwall" filter characteristics. FIG. 1 illustrates the distinction between an idealized "brickwall" filter characteristic and a generalized gradual rolloff filter characteristic. As indicated by graph 100, within a passband extending from a lower cutoff frequency $f_L$ to an upper cutoff frequency $f_h$, a "brickwall" filter passes frequency components of a signal without attenuation, while all out-of-band frequency components of this signal below $f_L$ or above $f_h$ are completely attenuated. The center frequency $f_c$ of the band is equal to the average of the respective cutoff frequencies $f_h$ and $f_L$, while the bandwidth is equal to the difference between the respective cutoff frequencies $f_h$ and $f_L$. If the filter is a bandpass filter, the value of the lower cutoff frequency $f_L$ is greater than zero. However, if the filter is a low-pass filter, the value of the lower cutoff frequency $f_L$ is zero.

In a spectrum analyzer for separating the frequency spectrum of an input signal into a plurality of contiguous subspectra signals, a "brickwall" filter characteristic completely prevents frequency components within one subspectrum from contaminating an adjacent subspectrum. However, the problem with a "brickwall" filter is that it rings when shock-excited by the energy of an out-of-band high-frequency pulse. For example, consider a video signal representing a horizontally scanned image comprised of a bright narrow light stripe surrounded by a relatively dark, substantially large uniform background area. The relatively dark background will contain spatial frequencies that fall within a relatively low spatial frequency subspectra. However, when the horizontal scan passes across the edge of the narrow bright light vertical stripe, a short, high-amplitude pulse is generated in the video signal that shock-excites a low spatial frequency subspectrum "brick-wall" filter into ringing. This causes a high spatial frequency bright ringing artifact to be generated which is superimposed on the portion of the dark background immediately following the bright vertical stripe. Such an artifact is quite noticeable because, as mentioned earlier, the human visual system is quite sensitive to a high spatial frequency spurious component superimposed on a low spatial frequency background. The present inventors point out it is undesirable to remove noticeable noise present in the original input signal by a process which, in itself, adds noticeable artifacts to the displayed image.

A generalized gradual rolloff filter characteristic for a bandpass filter is shown in graph 102 that has a center frequency $f_c$. Since the rolloff is gradual, there are no distinct lower and upper cutoff frequencies $f_L$ and $f_h$ to define the bandwidth of the passband of the filter. Instead, the nominal lower and upper cutoff frequencies $f_L$ and $f_h$ are defined by those frequencies at which the filter attenuates an input signal by a preselected amount (e.g. the half-power points shown in FIG. 1). The nominal bandwidth of the filter is then the difference between the nominal upper cutoff frequency $f_h$ and the nominal lower cutoff frequency $f_L$. However, as indicated by the shaded regions 104 in FIG. 1, a small amount of the energy in a given subspectrum band of a spectrum analyzer employing gradual rolloff filters will result in the contamination of adjacent subspectrum bands. This has a tendency to produce spurious aliasing spatial frequencies in an image-processing system employing sampled and subsampled signals. However, the image-processing system of the present invention, described in detail below, minimizes the effect of any aliasing.

In the case of a gradual rolloff bandpass filter, shown generally by graph 102 of FIG. 1, rolloff usually occurs on both the higher and lower frequency sides of the center frequency $f_c$. In the case of a gradual rolloff low-pass filter, however, only the high frequency side of the center frequency $f_c$ actually rolls off. The exact shape of the roll-off of any specific gradual rolloff filter characteristic is a matter of design. Design criteria suitable for gradual rolloff filters employed by the image-processing system of the present invention is discussed in more detail below.

Figure 2:
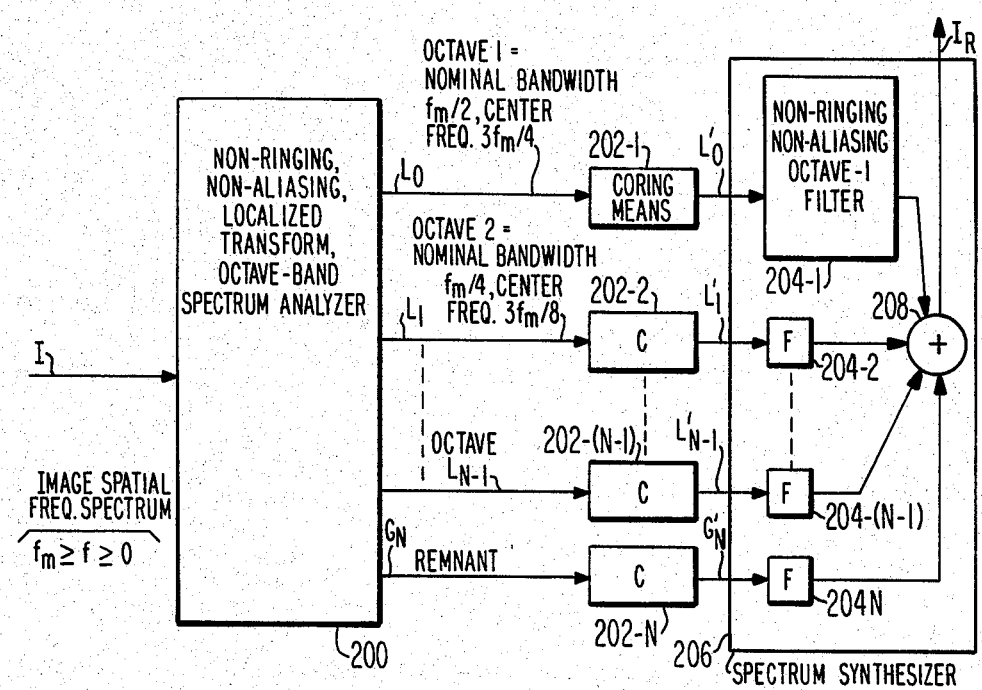
FIG. 2 is a functional block diagram of an idealized embodiment of the present invention.

FIG. 2 is a functional block diagram of an idealized embodiment of the present invention. A non-ringing, non-aliasing localized transform, octave-band spectrum analyzer 200 has an image-representing signal I supplied as an input thereto. In principle, input signal I can be a continuous analog signal, a sampled analog signal (such as is employed by CCD imagers and signal-translators) or a sampled digital signal (such as is derived from an analog-to-digital converter). In practice, however, image processing of the type being discussed is nearly always carried out on a sampled image-representing signal by a spectrum analyzer employing a digital computer in non-real time or, alternatively, employing physical hardware that may operate either in real time or in non-real time. Therefore, for illustrative purposes, it is assumed that input signal I is a sampled signal, rather than a continuous signal.

As indicated in FIG. 2, the image-representing signal I is defined in at least one dimension of the represented image by a spectrum of spatial frequencies within a range extending from a maximum frequency $f_m$ to zero. In order that signal I contain no spatial frequencies higher than $f_m$, it is assumed to have been passed through a prefilter. For illustrative purposes, it will be assumed that input signal I is a temporal video signal derived from a conventionally scanned two-dimensional television image (although this is not essential). In any case, analyzer 200 separates the spatial frequency spectrum of input signal I into N (where N is any given integer) contiguous bandpass subspectra output signals $L_0 \ldots L_{N-1}$, and a remnant subspectrum output signal $G_N$. Bandpass subspectra output signals $L_0 \ldots L_{N-1}$ are arranged in descending spatial frequency order, starting from $f_m$, into respective nominal bandwidths of one octave within the range $f_m$ to zero. Remnant subspectrum output signal $G_0$ contains all those spatial frequencies of the spectrum of input signal I which are below those contained in the (N−1) bandpass subspectrum (which is the lowest spatial frequency bandpass subspectrum). More specifically, as shown in FIG. 2, octave 1 has a nominal bandwidth of $f_m/2$ and a center frequency of $3f_m/4$, octave 2 has a nominal bandwidth of $f_m/4$ and a center frequency of $3f_m/8$, and so forth.

Each of coring means 202-1 ... 202-N has a corresponding one of the subspectra output signals $L_0 \ldots L_{N-1}$ and $G_N$ applied as an input thereto. Respective outputs $L_0 \ldots L_{N-1}$ and $G_N$ from coring means 202-1 ... 202-N are applied to corresponding ones of non-ringing, non-aliasing filters 204-1 ... 204-N of spectrum synthesizer 206. Spectrum synthesizer 206 also includes summer 208 for summing the respective outputs from filters 204-1 ... 204-N to derive a reconstructed output image-manifesting signal $I_R$.

Spectrum analyzer 200 performs a linear transformation on the image spatial frequency spectrum of the image-representing input signal I. Therefore, in the ideal case in which spectrum analyzer 200 provides a substantially non-ringing, non-aliasing localized transform, no significant amount of baseband spatial frequency will be present in any of the respective outputs from spectrum analyzer 200 which is not also present in the image spatial frequency spectrum of the input image-representing signal I. Thus, no significant amounts of spurious spatial frequency components are introduced by spectrum analyzer 200. However, coring means 202-1 ... 202-N, which inherently operate in a non-linear manner, do introduce spurious spatial frequency components in each of the output signals $L'_0 \ldots L'_{N-1}$ and $G'_N$. These spurious spatial frequency components are comprised of harmonic components and intermodulation components of the subspectrum spatial frequencies applied as an input to each of coring means 202-1 ... 202-N. All harmonics of any spatial frequency within an octave-bandwidth subspectrum have spatial frequencies above that octave-bandwidth subspectrum. Also, those intermodulation components having a spatial frequency equal to the sum of different spatial frequencies within an octave-bandwidth subspectrum are situated above that octave-bandwidth subspectrum. Further, those intermodulation components having a spatial frequency equal to the difference between different spatial frequencies within an octave-bandwidth subspectrum are situated below that octave-bandwidth subspectrum.

If the output from a coring means operating on an octave-bandwidth subspectrum input were applied to a bandpass filter exhibiting a "brickwall" characteristic (of the type shown in graph 100 of FIG. 1), all the spurious spatial frequencies of the harmonic and intermodulation components generated by the coring means would be rejected by the filter. However, for the reasons discussed above, such a "brickwall" characteristic filter would tend to introduce shock-excited spurious spatial frequency ringing components. In order to avoid introduction of such spurious spatial frequency ringing components, such bandpass filter should have a gradual rolloff filter characteristic (such as shown in graph 102 of FIG. 1) and a nominal bandwidth of an octave. In this latter case, a small amount of out-of-band harmonic and intermodulation spatial frequency components will not be completely rejected because of the presence of the out-of-band portions of the gradual rolloff filter characteristic (i.e., the shaded portions 104 shown in FIG. 1). However, as discussed in more detail below, the amount of spurious spatial frequency components due to a gradual rolloff characteristic can be made insignificant (i.e. essentially unnoticeable in a displayed image) by proper filter design.

Each of filters 204-1 . . . 204-(N−1) of spectrum synthesizer 206 may be bandpass filters or, alternatively, low-pass filters. In the case in which these filters are bandpass filters, each filter has a center frequency and a nominal bandwidth corresponding to the octave subspectrum with which it is associated. In the case in which these filters are low-pass filters, they have a nominal bandwidth from zero to a nominal upper cutoff frequency that is the same as that of a corresponding bandpass filter associated with the same octave subspectrum. Filter 204-N associated with the remnant subspectrum, is a low-pass filter having a nominal upper cutoff frequency substantially equal to a lower cutoff frequency of the (N−1) octave subspectrum.

If low-pass (rather than bandpass) filters are employed for octave filters 204-1 . . . 204-(N−1), the below-band difference (beat) spurious spatial frequency components of the coring process will not be rejected. However, such beat intermodulation signals tend to be low-level signals that are not easily noticed by the human visual system if present in a displayed image. In part this is because these lower spatial frequency beats are de-localized and randomly overlapping, and in part this is due to the masking effect of the relatively high-level signal content of most real world images in the lower spatial frequency portion of the image spatial frequency spectrum. Further, in practical systems, suitable non-ringing, non-aliasing gradual rolloff characteristics are more easily implemented for low-pass filters than for bandpass filters.

Although, in FIG. 2, each and every one of the subspectra output signals from analyzer 200 has an individual coring means associated therewith, it is not essential to the present invention that this be the case. All that is required is that at least one of the subspectra output signals has a coring means individually associated therewith. However, if any of the coring means 202-2 . . . 202-N, associated with subspectra composed of spatial frequencies below those of octave 1 (that is the highest spatial frequency subspectrum) is present, it must have a corresponding one of filters 204-2 . . . 204-N of spectrum synthesizer 206 individually associated therewith in order to substantially remove therefrom at least the above-band spacious spatial frequency components due to the non-linear coring process. However, in the case of the octave 1 subspectrum, corresponding filter 204-1 of spectrum synthesizer 206 often is dispensed with. The reason for this is that most image displays are incapable of resolving spatial frequencies higher than the maximum spatial frequency $f_m$ of the octave 1 subspectrum. Because any above-band spurious spatial frequencies present in the synthesized output signal $I_R$ cannot be resolved in the image display, there is no need, in this particular case, to filter them out.

It is optional whether or not spectrum synthesizer 206 includes a non-ringing, non-aliasing filter individually associated with any one of the subspectra outputs in which coring is omitted. However, summer 208 sums all of the N bandpass and the remnant separate subspectra signals derived from spectrum analyzer 200, regardless of whether coring is omitted and/or filtering is omitted from any of the subsepctra output signals from spectrum analyzer 200.

Figure 2A:
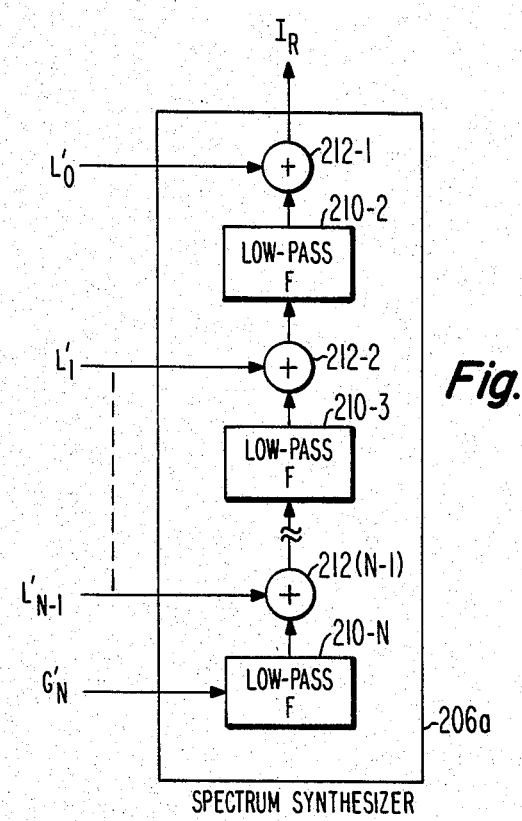
FIG. 2a illustrates an alternative embodiment of the spectrum synthesizer of FIG. 2.

Reference is now made to FIG. 2a, which illustrates a modified spectrum synthesizer 206a which can be substituted for the spectrum synthesizer 206 of FIG. 2. Spectrum synthesizer 206a employs a plurality of low-pass filters 210-2 . . . 210-N and partial summers 212-1 . . . 212-(N−1). Low-pass filter 210-2 has a nominal upper cutoff frequency equal to one-half the maximum spatial frequency $f_m$ of the image spatial frequency spectrum of the input image-manifesting signal I (that is the upper cutoff frequency of the octave 2 subspectrum). In a similar manner, each of the low-pass filters 210-3 . . . 210-(N−1) has a nominal upper cutoff frequency equal to that of the octave subspectrum with which it is associated. Low-pass filter 210-N has a nominal upper cutoff frequency equal to the nominal lower cutoff frequency of the (N−1) octave subspectrum.

In FIG. 2a, the filters and partial summers in reverse ordinal order are intercoupled in cascade. The result is that the lowest spatial frequency subspectrum signal (cored remnant signal $G'_N$) is successively filtered, in turn, by each of the cascaded low-pass filters 210-N . . . 210-2. As indicated in FIG. 2a, next-to-lowest spatial frequency subspectrum signal $L'_{N-1}$ and the output of filter 210-N are summed by partial summer 212-(N−1), and then successively filtered, in turn, by each of the cascaded low-pass filters 210-(N−1) . . . 210-2. In a similar manner, each of the cored higher spatial frequency octave subspectra signals $L'_{(N-2)}$ . . . $L'_2$ is successively filtered, in turn, by all of the filters of spectrum synthesizer 206a which are shown in FIG. 2a above that cored subspectrum signal. Finally, the output from filter 210-2 is summed with the cored highest spatial frequency octave subspectrum $L'_0$ by partial summer 212-1 to derive a reconstructed output image-representing signal $I_R$. In FIG. 2a, it is assumed that the image display cannot resolve spatial frequencies above the maximum spatial frequency $f_m$ of the input image spectrum, so that it is not necessary to provide a low-pass filter for the output from partial summer 212-1.

Based on the discussion of FIGS. 2 and 2a, it is essential to the present invention that no output subspectrum signal from spectrum analyzer 200, other than the remnant signal, have a nominal bandwidth of more than one octave. However, the principles of the present invention apply to analyzed bandpass subspectra signals each having a spatial frequency bandwidth smaller than one octave.

The Burt Pyramid spectrum analyzer and the Burt Pyramid spectrum synthesizer, described in detail in the aforesaid co-pending Carlson et al. application, are particularly suitable for use in a practical implementation of spectrum analyzer 200 and spectrum synthesizer 206a of the present invention for at least two reasons. First, the Burt Pyramid permits filters with gradual rolloff characteristics, rather than "brickwall" characteristics, to be suitable for use in both its spectrum analyzer and spectrum synthesizer. Second, in its most preferred form, the Burt Pyramid spectrum analyzer generates nominal octave bandwidth bandpass subspectra output signals and a remnant subspectrum output signal.

The Burt Pyramid analyzer disclosed in the aforesaid co-pending Carlson et al. patent application operates on a sampled input signal designated $G_0$. In the following description of the Burt Pyramid, it is assumed that $G_0$, which corresponds with the image-representing input signal I of FIG. 2, is in the form of a conventional video signal (e.g. an NTSC video signal) defining the spatial frequency spectrum of successively scanned two-dimensional television images, which video signal first has been prefiltered to remove any component thereof representing a spatial frequency higher than a given maximum spatial frequency $f_m$ and then has been sampled at a sampling frequency of at least twice $f_m$.

Figure 3A:
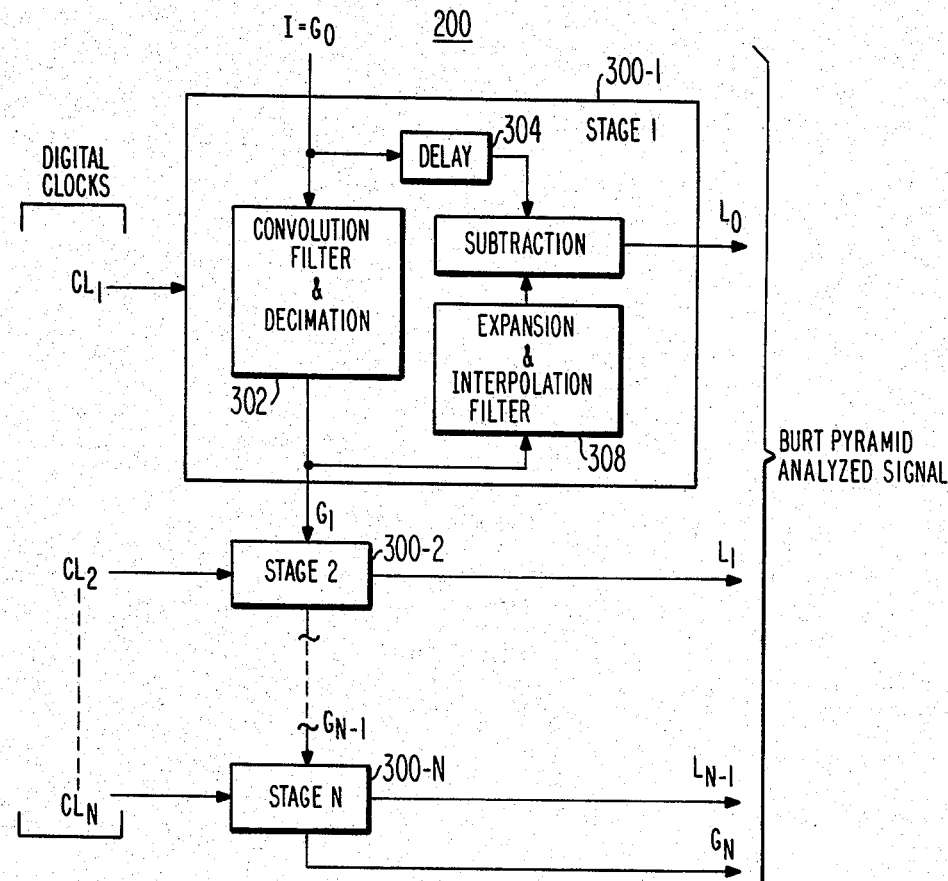
FIG. 3a illustrates a Burt Pyramid spectrum analyzer which is useful in a practical implementation of the spectrum analyzer of FIG. 2.

The real-time Burt Pyramid analyzer disclosed in the aforesaid co-pending Carlson et al. patent application is shown in the FIG. 3a functional diagram. As indicated in FIG. 3a, the analyzer is comprised of a pipeline of generally similar sampled-signal translation stages 300-1, 300-2 . . . 300-N. Each of the respective stages operates at a sample frequency determined by the value of the digital clock $CL_1$, $CL_2$ . . . $CL_N$ individually applied thereto. The value of the clock applied to any particular one of the stages is lower than the value of the clock applied to any stage that precedes it. In the case of the present invention, the value of each of the clocks of stages 300-2 . . . 300-N is one-half of the clock of the immediately preceding stage.

As indicated in FIG. 3a, stage 300-1 is comprised of convolution filter and decimation means 302, delay means 304, subtraction means 306 and expansion and interpolation filter means 308. An input stream of digital samples $G_0$, having a sample frequency equal to the value of clock $CL_1$ is applied through convolution filter and decimation means 302 to derive an output stream of digital samples $G_1$ at a sample frequency equal to the value of clock $CL_2$. The convolution filter has a low pass function that reduces the center frequency of each image dimension represented by $G_1$ to one-half of the center-frequency of the corresponding dimension represented by $G_0$. At the same time, the decimation reduces the sample density in each dimension by one-half.

The respective digital samples of $G_0$ are applied through delay means 304 as a first input to subtraction means 306. At the same time, the reduced-density digital samples of $G_1$ are applied to expansion and interpolation filter 308, which increases the sample density of the $G_1$ samples back to that of $G_0$. Then, the expanded density interpolated $G_1$ samples are applied as a second input to subtraction means 306. The presence of delay means 304 ensures that each pair of samples of $G_0$ and $G_1$, which correspond with one another in spatial position, are applied to the first and second inputs of subtraction means 306 in time coincidence with one another. The output stream of successive samples $L_0$ from subtraction means 306 defines the highest spatial frequency in each dimension of the scanned image.

The structure of each of stages 300-2 . . . 300-N is essentially the same as that of stage 300-1. However, each of the higher ordinal numbered stages 300-2 . . . 300-N operates on lower spatial frequency signals occurring at lower sample densities than its immediately preceding stage. More specifically, the output stream of successive samples $L_1$ represents the next-to-highest octave of spatial frequencies in each image dimension, etc., so that, as indicated in FIG. 3a, the Burt Pyramid analyzed signal is comprised of respective octave sample streams $L_0$ . . . $L_{N-1}$ (derived respectively from the subtraction means of each of stages 300-1 . . . 300-N) together with a low-frequency remnant signal $G_N$ (derived from the output of the convolution filter and decimation means of stage 300-N).

Figure 3B:
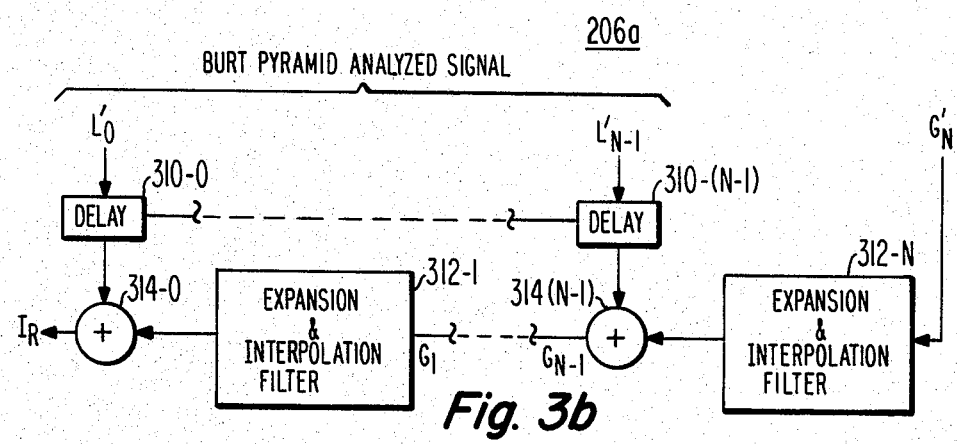

Referring to FIG. 3b, there is a Burt Pyramid synthesizer corresponding to synthesizer 206a of FIG. 2a, for deriving the reconstituted output signal $I_R$. This is accomplished by the use of appropriate delay means 310-0 . . . 310-(N−1) operating on the cored sample streams $L'_0$ . . . $L'_{N-1}$, together with expansion and interpolation filters 312-1 . . . 312-N and summers 314-0 . . . 314-(N−1). As indicated, the lowest density remnant sample stream $G_N$ has its sampling density doubled in each of the image spatial dimensions represented thereby by expansion and interpolation filter 312-N, and is then added to a delayed sample stream $L_{N-1}$ by the summer 314-(N−1). By iteration of this process—through successive synthesis stages, the reconstituted output signal $I_R$, defining the cored two-dimensional image at the highest sample density, is derived.

The respective convolution filters and interpolation filters employed by the Burt Pyramid are low-pass filters that must meet each of the following two constraints. First, each of these filters employs a symmetric kernel weighting function composed of at least three multiplier coefficients. Second, the multiplier coefficients of the kernel weighting function must provide equal contribution; that is, all nodes at a given level must contribute the same total weight to nodes at the next higher level. Practical provision for a substantially non-ringing, non-aliasing, localized transform filter characteristic, as required by the present invention, imposes additional constraints on the kernel weighting function employed by the convolution and interpolation low pass filters of a Burt Pyramid analyzer and synthesizer used for implementing the present invention. These additional constraints will now be considered.

Because each stage of the Burt Pyramid analyzer shown in FIG. 3a operates on a sampled input signal, the spatial frequency spectrum of such sampled input signal will not only include a baseband portion, but will include respective repeat portions consisting of both a lower and an upper sideband each modulating the fundamental of the sampling frequency and each of the harmonics of the sampling frequency. Further, in order to prevent aliasing, the sampling frequency should be at least twice the maximum frequency of the baseband spatial frequency spectrum of the sampled input signal to each stage of the Burt Pyramid analyzer.

By mathematical analysis, it can be shown that, at baseband, each of Burt Pyramid spectrum analyzer stages 300-1 . . . 300-N approximates a non-ringing, non-aliasing localized transform device for deriving a corresponding octave-bandwidth one of Burt Pyramid analyzed signals $L_0 \ldots L_{N-1}$, when each of the following listed relationships is true:

1. Over the spatial frequency range $0 \leq f \leq f_h/4$ (where $f_h$ is the nominal upper cutoff frequency of each octave subspectrum signal), the product of the respective normalized transmission characteristics of the convolution and interpolation filters of each stage is unity. Preferably, each of the convolution and interpolation filters of each stage, itself, has a transmission characteristic of unity over this range.
2. Over the spatial frequency range $f_h \leq f \leq 3f_h/4$, the product of the respective normalized transmission characteristics of the convolution and interpolation filters of each stage has a gradual rolloff. Preferably, each of the convolution and interpolation filters of each stage, itself, has a gradual rolloff over this range.
3. Over the spatial frequency range $3f_h/4 \leq f \leq f_h$, the product of the respective normalized transmission characteristics of the convolution and interpolation filters of each stage is zero. Preferably, each of the convolution and interpolation filters of each stage, itself, has a transmission characteristic of zero over this range.

Only the convolution filter of stage 300-N of the Burt Pyramid analyzer is employed to generate the remnant subspectrum signal $G_N$. Therefore, in the case of stage 300-N, the convolution filter thereof should substantially conform to each of criteria 1, 2 and 3, listed above. Also, each of the interpolation filters of the Burt Pyramid synthesizer shown in FIG. 3b should conform to each of these three criteria (where $f_h$, in the case of the synthesizer, is the upper cutoff frequency of the signal output of the summer immediately following each interpolation filter of FIG. 3b).

Figure 4A:
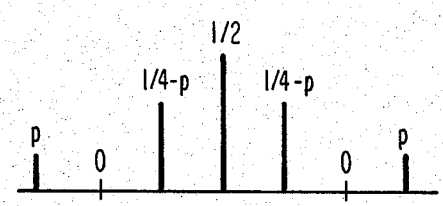
FIG. 4 is a graph of the baseband envelope of a seven multiplier-coefficient kernel weighting function having the respective values shown in FIGS. 4 and 4a of the convolution or interpolation filter of a Burt Pyramid analyzer and/or synthesizer useful in implementing the present invention.
Figure 4:
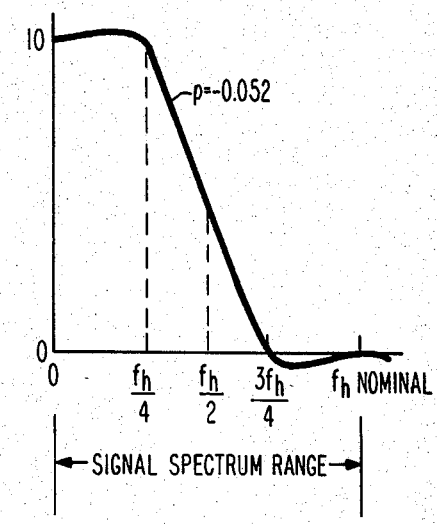

The design of practical convolution and interpolation filters must not only substantially conform to all three of the above-listed criteria, but also must conform to the constraints of symmetrical and equal-contribution kernel weighting functions, discussed above. Such a Burt Pyramid sampled-signal convolution or interpolation filter employing a kernel weighting function comprised of only three multiplier coefficients cannot meet either above-listed criterion 1 or criterion 3. For a sampling frequency just equal to twice the nominal upper cutoff frequency $f_h$ of an octave (the minimum sampling frequency necessary to prevent aliasing), a five multiplier-coefficient kernel weighting function sampled-signal Burt-Pyramid convolution or interpolation filter can be designed which meets either of the above-listed criteria 1 and 2, but not both. To design a practical Burt-Pyramid convolution or interpolation filter which meets all of the above-listed three criteria requires at least a seven multiplier-coefficient kernel weighting function sampled-signal filter. More particularly, for the case in which the sampling frequency has its minimum substantially non-aliasing value of just twice the nominal upper cutoff frequency $f_h$ of the filter input-signal spectrum, the FIG. 4 baseband filter characteristic (substantially meeting all of the above-listed three criteria) is defined by the seven multiplier-coefficient, symmetrical, equal contribution filter kernel weighting function shown in FIG. 4a, when the variable p has a value of minus $(-)0.052$.

For the case under discussion (in which the sampling frequency has its nominal minimum non-aliasing value), a seven multiplier-coefficient kernel weighting function provides a substantially localized transform, since it operates on a relatively localized image region. A nine multiplier-coefficient kernel weighting function (which is usually sufficiently small to still provide a substantially localized transform for its nominal minimum non-aliasing sampling frequency) may be desirable because it permits a greater fine-tuning capability than does a seven multiplier-coefficient kernel weighting function in defining the shape of the gradual rolloff portion of the baseband filter characteristic. However, for a nominal minimum non-aliasing sampling frequency, the filter transform tends to become more and more non-localized as the number of multiplier coefficients of the filter kernel weighting function increases beyond nine, and this is undesirable. On the other hand, if the filter input signal is oversampled (i.e. the sampling frequency is significantly greater than twice the nominal upper cutoff frequency $f_h$ of the filter input signal spectrum) the number of multiplier coefficients in the kernel weighting function must be increased accordingly to provide the same filter characteristic with the same degree of localization. For instance, if the sampling frequency in FIGS. 4 and 4a were four time $f_h$, the kernel weighting function having the same envelope as the kernel weighting function of FIG. 4a would be comprised of thirteen to fifteen multiplier coefficients (that is, an interpolated-value multipler coefficient would be inserted between each pair of adjacent multiplier coefficients of FIG. 4a).

Figure 5:
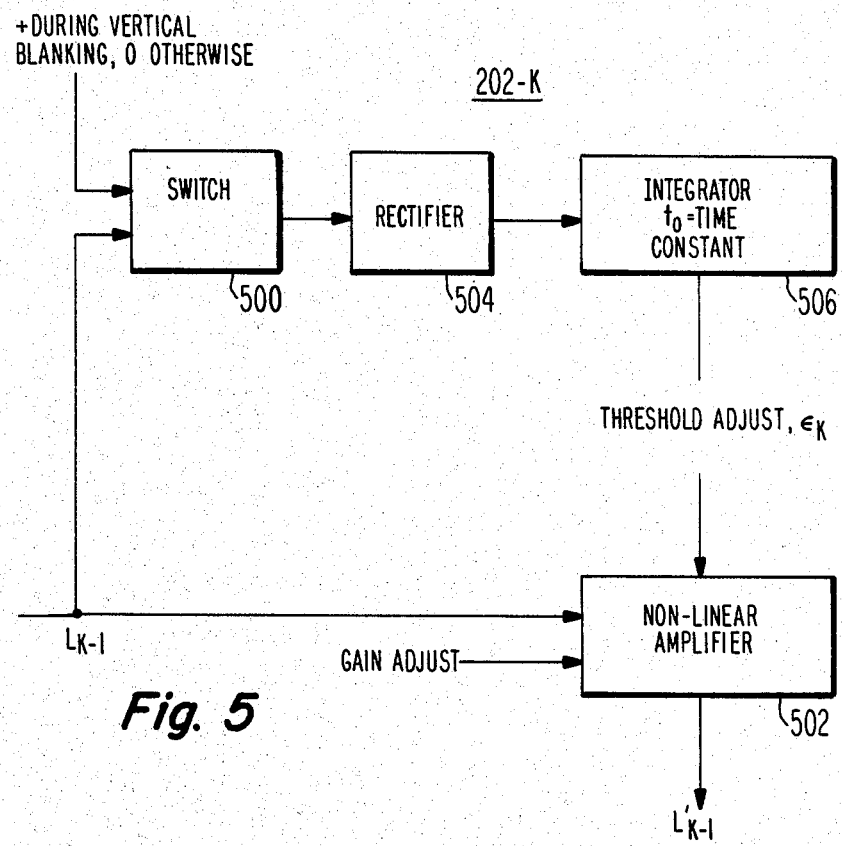
FIG. 5 is a block diagram of a preferred embodiment of the coring means of FIG. 2, which coring means is suitable for coring a video signal defining a scanned two-dimensional television image.

Because coring is a non-linear process and introduces artifacts, it is not desireable to core any more than is necessary to remove the noise that is actually present in the signal input to the coring means. Put another way, the coring threshold should be maintained at the lowest level sufficient to remove the amount of noise then currently present in the signal input to the coring means. FIG. 5 is a block diagram of a preferred embodiment of each of coring means 202-1 . . . 202-N for use with a standard (e.g. NTSC) video signal representing a scanned two-dimensional television image. As is known in television, such as video signal includes successive interlaced scanned fields, with each scanning field being made up of an active field portion, during which image information is transmitted, and a vertical blanking portion, during which no image information is transmitted. The noise present during the vertical blanking portion of each successive field can be employed as a measure of the noise component during the active portion of the following field.

As shown in FIG. 5, coring means 202-K (where K corresponds with any ordinal one of coring means 202-1 . . . 202-N) is comprised of switch 500 to which a control signal is applied for closing switch 500 only during the occurrence of the vertical blanking portion of each successive field. Therefore, switch 500 is maintained in its open condition during the entire active portion of each successive field. The $L_{K-1}$ subspectrum output signal, associated with coring means 202-K is applied as a signal input to both switch 500 and non-linear amplifier 502. Thus, only the noise component of $L_{K-1}$ is forwarded by closed switch 500 to rectifier 504 (since the signal during a vertical blanking portion consists solely of noise). The rectified noise component from rectifier 504 is applied to integrator 506, which exhibits a time constant to sufficiently long to stretch the rectified noise component signal occurring during each vertical blanking portion of a field to entirely cover the immediately following active portion of the field. Therefore, integrator 506 generates a dc threshold signal having an adjustable magnitude $\epsilon_K$ for each active portion of a field that is proportional to the absolute level of the noise component (and is consequently directly related to the strength of the noise component) during the immediately preceding vertical blanking portion of a field. This adjustable threshold is applied as a control signal to non-linear amplifier 502. In addition, the gain of a non-linear amplifier of each one of coring means 202-N . . . 202-K is individually adjusted by a gain adjust control so that the effect on overall signal gain of the different thresholds for each of coring means 202-1 . . . 202-N is compensated for. More particularly, as the threshold magnitude $\epsilon_K$ becomes relatively larger, the relative power of the cored output signal $L'_{K-1}$ from non-linear amplifier 502 becomes smaller compared to that of the $L_{K-1}$ input signal thereto. The gain adjustment compensates for this fact so that the power contribution to the synthesizer output signal $I_R$ signal from each separately cored subspectrum signal, such as the $L'_{K-1}$ output from non-linear amplifier 502, remains substantially the same as that of the corresponding $L_{K-1}$ subspectrum signal to the input signal I to the spectrum analyzer.

Non-linear amplifier 502 operates by amplifying only that portion of the $L_{K-1}$ input signal thereto which has an absolute level exceeding the current magnitude of the adjustable threshold. Thus, even when the absolute level of the input signal exceeds the current magnitude of the adjustable threshold, only the clipped portion of the input signal that exceeds the current magnitude is passed by non-linear amplifier 502 and contributes to the coring means $L'_{K-1}$ output signal power. An alternative technique would be to compare the absolute level of the input signal with the magnitude of the adjustable threshold and, if the absolute level of the input signal exceeds the magnitude of the threshold, all of the input signal would be passed to the $L'_{K-1}$ output; otherwise, none of the input signal would be passed. This alternative technique has the advantage that appreciably more of the input signal power is retained in the output signal power. However, in wide-band coring schemes, a disadvantage of this alternative technique is that it tends to produce a high spatial frequency artifact known as "sparkle" in the displayed image derived from the output of such a coring means. However, an image processing system using narrow-band coring in accordance with the principles of the present invention the filtering after coring suppresses "sparkle", making this alternative technique more practical.

What is claimed is:
1. An image-processing system comprising:
a substantially non-ringing, non-aliasing, localized transform spectrum analyzer responsive to an input image-representing signal defined in at least one dimension of the represented image by a spectrum of spatial frequencies within a range extending downward from a maximum frequency $f_m$ to zero, said analyzer separating said input-signal spectrum in descending spatial frequency order starting from $f_m$ into a group of one or more contiguous bandpass subspectra output signals each of which subspectrum has a nominal bandwidth no greater than one octave within said range, and into a remnant subspectrum output signal contining all those spatial frequencies of said input-signal spectrum which are below those contained in the lowest spatial frequency bandpass subspectrum output-signal;

means for coring at least one of said bandpass subspectra output signals and remnant subspectrum output signal, thereby introducing spurious out-of-band spatial frequency components into each cored subspectrum output signal; and a spectrum synthesizer coupler to said analyzer through said coring means and responsive to all of said subspectra signals from said analyzer being applied thereto for deriving an output image-representing signal;

wherein said synthesizer is comprised of substantially non-ringing, non-aliasing filter means individually associated with the subspectrum of at least each cored signal that is lower than the highest spatial frequency bandpass subspectrum output signal, for substantially removing at least those spurious frequency components therefrom which are above-band with regard to that subspectrum, and means for summing all said subspectra signals, including both any that has been cored and/or filtered and any that has been neither cored nor filtered, thereby to derive said output image representing signal;

whereby any noise component originally present in the spectrum of said input image-representing signal has been reduced in the spectrum of said output image-representing signal without introducing any signifficant amount of aliasing or other spurious spatial frequency component in the spectrum of said output image-representing signal.

2. The system defined in claim 1, wherein:
said output image-representing signal is to be employed to display an image on a display device having a resolution capability insufficient to noticeably display any spatial frequency higher than $f_m$; and said highest spatial frequency octave output signal from said spectrum is coupled through said coring means to said summing means without having any of said synthesizer filter means individually associated therewith.

3. The system defined in claim 1, wherein each of said synthesizer filter means is comprised of a low-pass filter having a gradual rolloff about a nominal cutoff frequency equal to the upper spatial frequency of the subspectrum with which that filter means is individually associated.

4. The system defined in claim 3, wherein said synthesizer comprises:
at least two of said low-pass filters that are coupled in cascade through a summer, a first of said filters being individually associated with a relatively lower one of said subspectra and a second of said filters being individually associated with a relatively higher one of said subspectra;

means for applying said relatively lower one of said subspectra signals as an input to said first of said low-pass filters;

means for applying the output of said first of said low-pass filters as a first input to said summer;

means for applying said relatively higher one of said subspectra signals as a second input to said summer; and means for applying the output of said summer as an input to said second of said low-pass filters;

whereby said lower one of said subspectra signals is filtered by both said first and second of said cascaded low-pass filters.

5. The system defined in claim 4, wherein both said lower and higher ones of said subspectra signals are cored subspectra signals.

6. The system defined in claim 5, wherein said lower and higher ones of said subspectra are contiguous subspectra.

7. The image-processing system defined in claim 1, wherein:

said input image-representing signal is a video signal representing an image that has been scanned in at least said one dimension; said video signal contains no temporal frequency corresponding to an image spatial frequency greater than $f_m$, and said video signal is sampled at a temporal sampling frequency corresponding to at least twice $f_m$;

said spectrum analyzer is a Burt Pyramid spectrum analyzer including one stage for deriving the highest one of said subspectra output signals therefrom, said one stage inlcuding (1) convolution filter-decimation means responsive to said sampled video signal for deriving a first filtered output signal therefrom at one-half the sample frequency of said video signal, (2) expander-interpolation means having said first filtered output signal applied as an input thereto for deriving a second filtered output signal therefrom at the same sample frequency as said video signal, and (3) means for subtracting the level value of each sample of said second filtered output signal from the level value of the corresponding sample of said video signal to thereby derive said highest one of said subspectra output signals as the output from said subtraction means; and each of the convolution filter and interpolation filter of said one stage exhibits a filter spatial frequency characteristic in accordance with a symmetrical, equal-contribution kernel weighting function that includes at least seven multiplier-coefficients having respective values such that the product of the respective filter spatial frequency characteristics of said convolution and interpolation filters is a given spatial frequency characteristic (a) which is substantially unity over a spatial frequency range extending from zero to $f_m/4$ (b) which has a gradual rolloff over a spatial frequency range extending from $f_m/4$ to $3f_m/4$, and (c) which is substantially zero over a spatial frequency range extending from $3f_m/4$ to $f_m$.

8. The image-processing system defined in claim 7, in which each of said convolution and interpolation filters exhibits said given spatial frequency characteristic.

9. The image-processing system defined in claim 8, wherein:

said Burt Pyramid analyzer includes N stages where N is a plural integer and said one stage is the first ordinal one of said N stages, for respectively deriving each of said bandpass subspectra output signals, and at least each of said second to (N−1)th stage includes (1) a convolution filter decimation means responsive to the first filtered output signal from the convolution filter decimation means of the immediately preceding stage for deriving a first filtered output therefrom at one-half the sample frequency of that of the first filtered output signal from the convolution filter-decimation means of the immediately preceding stage, (2) expander-interpolation filter means having said first filtered output of that stage applied as an input thereto for deriving a second filtered output signal therefrom at the sampling frequency of the first filtered output signal of the immediately preceding stage, and (3) means for subtracting the level value of each sample of said second filtered output signal of a stage from the corresponding sample of the first filtered output signal of the immediately preceding stage to thereby derive an octave-bandpass subspectra output signal corresponding to that stage; and each of the convolution filter and interpolation filter of each of said second to (N−1)th stage exhibits a filter spatial frequency characteristic in accordance with a symmetrical, equal contribution kernel weighting function that includes at least seven multiplier-coefficients having respective values such that the respective spatial frequency characteristic of said convolution filter and interpolation filter of a stage (a) is substantially unity over a range extending from zero to $f_m/4$, where $f_m$ is the nominal upper frequency of the spatial frequency spectrum of the first filtered output signal of the immediately preceding stage, (b) has a gradual rolloff over a spatial frequency range extending from $f_m/4$ to $3f_m/4$, and (c) is substantially zero over a spatial frequency range extending from $3f_m/4$ to $f_m$.

10. The image-processing system defined in claim 9, wherein:

wherein all of the second to Nth stages include the elements (1) (2) and (3) defined in claim 9 and have the spatial frequency characteristics (a), (b) and (c) defined in claim 9, and said remnant subspectra output signal of said analyzer is the first filtered output signal of said Nth stage.

11. The image-processing system defined in claim 10, wherein said synthesizer is a Burt Pyramid synthesizer including:

an ordinal set of N expander-interpolation filter means and summers that individually correspond with each of the N stages of said Burt Pyramid analyzer, said expander-interpolation filter means and summers being intercoupled in cascade in reverse order with the output of each expander-interpolation filter means being applied as a first input to a summer and the output of that summer being applied as an input to the immediately preceding ordinal one of said expander-interpolation filter means in said set, said remnant subspectrum signal being applied as an input to the Nth expander-interpolation filter means of said set, the bandpass subspectrum signal associated with each of said N stages of said analyzer being applied as a second input to the corresponding summer of said set, whereby the output of the summer of said set corresponding to the first stage of said analyzer constitutes said output image-representing signal; and wherein each of the interpolation filters exhibits a filter spatial frequency characteristic in accordance with a symmetrical, equal contribution kernel weighting function that includes at least seven multiplier-coefficients having respective values such that the respective spatial frequency characteristic of said interpolation filter of a stage (a) is substantially unity over a range extending from zero to $f_m/4$, where $f_m$ is the nominal upper frequency of the spatial frequency spectrum of the first filtered output signal of the immediately preceding stage, (b) has a gradual rolloff over a spatial frequency range extending from $f_m/4$ to $3f_m/4$, and (c) is substantially zero over a spatial frequency range extending from $3f_m/4$ to $f_m$.

12. The image-processing system defined in claim 11, wherein said input-image-representing signal is a video signal representing a two-dimensional image that has been scanned in both of said two dimensions.

13. The image-processing system defined in claim 1, wherein said input-image-representing signal is a video signal representing a two-dimensional image that has been scanned in both of said two dimensions.

14. The image-processing system defined in claim 13, wherein:
said video signal is a television raster-scanned video signal comprised of successively-occurring scanning fields, each of said scanning fields including a blanking portion followed by an active video portion; and
each of said coring means includes first means comprised of switch means and time-constant means for deriving an adjustable threshold control signal having a magnitude during the active video portion of each scanning field which is a direct function of the noise level of the subspectrum output signal applied as an input to that coring means solely during the blanking portion of that scanning field, and second means controlled by said threshold control signal for deriving an output from that coring means only if the level of the input signal to that coring means during each scanning field exceeds the magnitude of said threshold control signal during that scanning field.

15. An image processing system for processing an input spectrum-analyzed image-representing signal, wherein said image-representing signal that has been spectrum-analyzed defines, in at least one dimension of the represented image spectrum, spatial frequencies within a range extending from a maximum frequency $f_m$ down to zero, and wherein said spectrum-analyzed image-representing signal, starting with $f_m$, is comprised, in descending spatial frequency order, of a group of one or more separate contiguous bandpass subspectra signals, each of which has a nominal bandwith no greater than one octave within said range, and a remnant subspectrum signal containing all those spatial frequencies of said image-representing signal spectrum which are below those contained in the lowest spatial frequency bandpass spectrum signal; said system including:
means for coring at least one of said bandpass subspectra signals, thereby introducing spurious out-of-band spatial frequency components into each cored subspectrum signal; and
a spectrum synthesizer coupled to said coring means and having all analyzed subspectra signals, including both those that have been cored and those that have not been cored, applied thereto for deriving an output image-representing signal;
wherein said synthesizer is comprised of substantially non-ringing, non-aliasing filter means individually associated with the subspectrum of at least each cored signal that is lower than the highest spatial frequency bandpass subspectrum output signal, for substantially removing at least those spurious frequency components therefrom which are above-band, and means for summing all said subspectra signals, including both any that has been cored and/or filtered and any that has been neither cored nor filtered, thereby to derive said output image-representing signal;
whereby any noise component originally present in said spectrum analyzed image-representing signal has been reduced in the spectrum of said output image-representing signal without introducing any significant amount of aliasing or other spurious spatial frequency component in the spectrum of said output image-representing signal.

16. The system defined in claim 15, wherein:
said output image-representing signal is to be employed to display an image on a display device having a resolution capability insufficient to noticeably display any spatial frequency higher than $f_m$; and
said highest spatial frequency octave output signal from said spectrum is coupled through said coring means to said summing means without having any of said synthesizer filter means individually associated therewith.

17. The system defined in claim 15, wherein each of said synthesizer filter means is comprised of a low-pass filter having a gradual rolloff about a nominal cutoff frequency equal to the upper spatial frequency of the subspectrum with which that filter means is individually associated.

18. The system defined in claim 17, wherein said synthesizer comprises:
at least two of said low-pass filters that are coupled in cascade through a summer, a first of said filters being individually associated with a relatively lower one of said subspectra and a second of said filters being individually associated with a relatively higher one of said subspectra;
means for applying said relatively lower one of said subspectra signals as an input to said first of said low-pass filters;
means for applying the output of said first of said low-pass filters as a first input to said summer;
means for applying said relatively higher one of said subspectra signals as a second input to said summer; and
means for applying the output of said summer as an input to said second of said low-pass filters;
whereby said lower one of said subspectra signals is filtered by both said first and second of said cascaded low-pass filters.

19. The system defined in claim 18, wherein both said lower and higher ones of said subspectra signals are cored subspectra signals.

20. The system defined in claim 19, wherein said lower and higher ones of said subspectra are contiguous subspectra.

21. The image-processing system defined in claim 15, wherein:
said image-representing signal which has been spectrum analyzed is a video signal representing an image that has been scanned in at least said one dimension; said video signal contains no temporal frequency corresponding to an image spatial frequency greater than $f_m$, and said video signal is sampled at a temporal sampling frequency corresponding to at least twice $f_m$;
said group of bandpass subspectra signal is comprised of N bandpass subspectra signals, where N is a plural integer;

said synthesizer is a Burt Pyramid synthesizer that includes an ordinal set of N expander-interpolation filter means and summers, said expander-interpolation filter means and summers being intercoupled in cascade in reverse order with the output of each expander-interpolation filter means being applied as a first input to a summer and the output of that summer being applied as an input to the immediately preceding ordinal one of said expander-interpolation filter means in said set, said remnant subspectrum signal being applied as an input to the Nth expander-interpolation filter means of said set, the bandpass subspectrum signal associated with each of said N bandpass subspectra signals being applied as a second input to the corresponding summer of said set, whereby the output of the summer of said set corresponding to the first stage of said analyzer constitutes said output image-representing signal; and wherein each of the interpolation filters exhibits a filter spatial frequency characteristic in accordance with a symmetrical, equal contribution kernel weighting function that includes at least seven multiplier-coefficients having respective values such that the respective spatial frequency characteristic of said interpolation filter of a stage (a) is substantially unity over a range extending from zero to $f_m/4$, where $f_m$ is the nominal upper frequency of the spatial frequency spectrum of the first filtered output signal of the immediately preceding stage, (b) has a gradual rolloff over a spatial frequency range extending from $f_m/4$ to $3f_m/4$, and (c) is substantially zero over a spatial frequency range extending from $3f_m/4$ to $f_m$.

22. The image-processing system defined in claim 21, wherein said input-image-representing signal is a video signal representing a two-dimensional image that has been scanned in both of said two dimensions.

23. The image-processing system defined in claim 15, wherein said input-image-representing signal is a video signal representing a two-dimensional image that has been scanned in both of said two dimensions.

24. The image-processing system defined in claim 23, wherein:

said video signal is a television raster-scanned video signal comprised of successively-occurring scanning fields, each of said scanning fields including a blanking portion followed by an active video portion; and each of said coring means includes first means comprised of switch means and time-constant means for deriving an adjustable threshold control signal having a magnitude during the active video portion of each scanning field which is a direct function of the noise level of the subspectrum output signal applied as an input to that coring means solely during the blanking portion of that scanning field, and second means controlled by said threshold control signal for deriving an output from that coring means only if the level of the input signal to that coring means during each scanning field exceeds the magnitude of said threshold control signal during that scanning field.

* * * * *

UNITED STATES PATENT AND TRADEMARK OFFICE
CERTIFICATE OF CORRECTION

PATENT NO. : 4,523,230

DATED : June 11, 1985

INVENTOR(S): Curtis R. Carlson, et al.

It is certified that error appears in the above-identified patent and that said Letters Patent is hereby corrected as shown below:

Column 6, line 34, change "$L_N-1$" to --$L_{N-1}$--

Column 11, line 11, change "$f_h \leq f \leq 3f_h/4$" to --$f_h/4 \leq f \leq 3f_h/4$--

Column 12, line 40, change "as" to --a--

Column 12, line 64, change "to" (1st occurrence) to "$t_o$"

Column 16, line 20, change "$f_m/4$" to --$f_h/4$--

Column 16, line 20, change "$f_m$" to --$f_h$--

Column 16, line 25, "$f_m/4$" should be --$f_h/4$--

Column 16, line 25, "$3f_m/4$" should be --$3f_h/4$--

Column 16, line 27, "$3f_m/4$" should be --$3f_h/4$--

Column 16, line 27, "$f_m$" should be --$f_h$--

Column 16, line 66, "$f_m/4$" should be --$f_h/4$--

UNITED STATES PATENT AND TRADEMARK OFFICE
CERTIFICATE OF CORRECTION

PATENT NO. : 4,523,230

DATED : June 11, 1985

INVENTOR(S): Curtis R. Carlson, et al.

It is certified that error appears in the above-identified patent and that said Letters Patent is hereby corrected as shown below:

Column 16, line 66, "$f_m$" should be $f_h$--

Column 17, line 2, "$f_m/4$" should be --$f_h/4$--

Column 17, line 2, "$3f_m/4$" should be --$3f_h/4$--

Column 17, line 4, "$3f_m/4$" should be --$3f_h/4$--

Column 17, line 4, "$f_m$" should be --$f_h$--

Column 19, line 28, "$f_m/4$" should be --$f_h/4$--

Column 19, line 28, "$f_m$" should be --$f_h$--

Column 19, line 32, "$f_m/4$" should be --$f_h/4$--

Column 19, line 32, "$3f_m/4$" should be --$3f_h/4$--

Column 20, line 2, "$3f_m/4$" should be --$3f_h/4$--

Column 20, line 2, "$f_m$" should be --$f_h$--

Signed and Sealed this

Twenty-second Day of October 1985

[SEAL]

Attest:

Attesting Officer

DONALD J. QUIGG

Commissioner of Patents and Trademarks—Designate